United States Patent [19]

Hitomi et al.

[11] Patent Number: 4,829,941
[45] Date of Patent: May 16, 1989

[54] INTAKE SYSTEM FOR MULTIPLE-CYLINDER ENGINE

[75] Inventors: Mitsuo Hitomi; Katsumi Okazaki; Junso Sasaki; Yasuhiro Yuzuriha, all of Hiroshima, Japan

[73] Assignee: Mazda Motor Corp., Hiroshima, Japan

[21] Appl. No.: 114,292

[22] Filed: Oct. 29, 1987

[30] Foreign Application Priority Data

Oct. 30, 1986 [JP] Japan .................. 61-256773

[51] Int. Cl.$^4$ .................................. F02B 75/18
[52] U.S. Cl. ................... 123/52 ML; 123/52 MV
[58] Field of Search ......... 123/52 M, 52 MB, 52 MC, 123/52 MV, 52 ML

[56] References Cited

U.S. PATENT DOCUMENTS 4,440,120  4/1984  Muller ........................... 280/691
4,736,714  4/1988  Hokazono et al. ............. 123/52 M

FOREIGN PATENT DOCUMENTS 0052522  5/1981  Japan ................................. 123/52 M
60-14169  11/1985  Japan .
00116021  6/1986  Japan ................................. 123/52 M
0241418  10/1986  Japan ................................. 123/52 M
0943416  7/1912  U.S.S.R. ............................ 123/52 M
2160264  12/1985  United Kingdom ............. 123/52 M Primary Examiner—David A. Okonsky
Attorney, Agent, or Firm—Gerald J. Ferguson, Jr.

[57] ABSTRACT

An intake system for a multiple-cylinder engine has a main intake passage open to the atmosphere at its upstream end, a plurality of discrete intake passages which communicate the respective cylinders with the main intake passage by way of intake ports, and a circular passage which is communicated with the cylinders. The circular passage is adapted to propagate pressure waves generated by the intake strokes without reflecting the pressure waves, and is provided with a valve which opens the circular passage to permit propagation of the pressure waves in a predetermined high engine speed range. The length of the circular passage is selected so that the pressure waves resonate in the predetermined high engine speed range.

23 Claims, 7 Drawing Sheets

INTAKE SYSTEM FOR MULTIPLE-CYLINDER ENGINE

BACKGROUND OF THE INVENTION

1. Field of the Invention

This invention relates to an intake system for a multiple-cylinder engine, and more particularly to an intake system for a multiple-cylinder engine which is arranged to be supercharged by a kinetic effect of intake air.

2. Description of the Prior Art

There have been put into practice two types of multiple-cylinder engines which are arranged to be supercharged by kinetic effect of intake air, one being a type supercharged by an inertia effect of intake air and the other being a type supercharged by a resonance effect of intake air.

From the viewpoint of compactly arranging the engine, the latter type is advantageous over the former type in that the former type must be provided with a surge tank which is inherently large in size while in the latter type, the surge tank is not necessarily needed. The engine of the latter type will be referred to as a "resonance-supercharged engine" hereinbelow.

In the resonance-supercharged engine, the engine speed range in which the resonance effect of intake air becomes maximum depends upon the length of the resonance tube which is formed by a part of the intake passage. That is, as the length of the resonance tube increases, the engine speed range in which the resonance effect of intake air becomes maximum is lowered (See Japanese Patent Publication No. 60(1985)-14169, for example.). Accordingly, in order to obtain a satisfactory resonance effect in a low engine speed range, the effective length of the intake passage must be large. On the other hand, in order to obtain a satisfactory resonance effect in a high engine speed range, the effective length of the intake passage must be small.

Thus, it has been difficult to obtain a resonance-supercharged engine in which a satisfactory supercharging effect can be obtained in both a low engine speed range and a high engine speed range.

Further, the length of the resonance tube differs from cylinder to cylinder, that is, the distance between the intake port and the pressure reflecting portion differs from cylinder to cylinder by the distance between adjacent intake ports. If the effective length of the intake passage is shortened in order to enhance the supercharging effect in a higher engine speed range, the difference in the length of the resonance tube becomes larger, and imbalance of the pressure waves acting on the cylinders is enhanced, thereby making it difficult to improve the volumetric efficiency of all the cylinders.

SUMMARY OF THE INVENTION

In view of the foregoing observations and description, the primary object of the present invention is to provide an intake system for a resonance-supercharged multiple-cylinder engine which can satisfactorily supercharge the engine in a high engine speed range.

Another object of the present invention is to provide an intake system for a resonance-supercharged engine which can satisfactorily supercharge the engine over a wide engine speed range without substantially increasing the overall size of the engine.

In accordance with the present invention, there is provided an intake system for a multiple-cylinder engine having a plurality o cylinders comprising a main intake passage open to the atmosphere at its upstream end, a plurality of discrete intake passages which communicate the respective cylinders with the main intake passage by way of intake ports, a circular passage which is communicated with the cylinders and is adapted to propagate pressure waves generated by the intake strokes without reflecting the pressure waves, and a valve means which opens the circular passage to permit propagation of the pressure waves in a predetermined high engine speed range, the length of said circular passage being selected so that the pressure waves resonate in said predetermined high engine speed range.

DESCRIPTION OF THE PREFERRED EMBODIMENT

Figure 1:
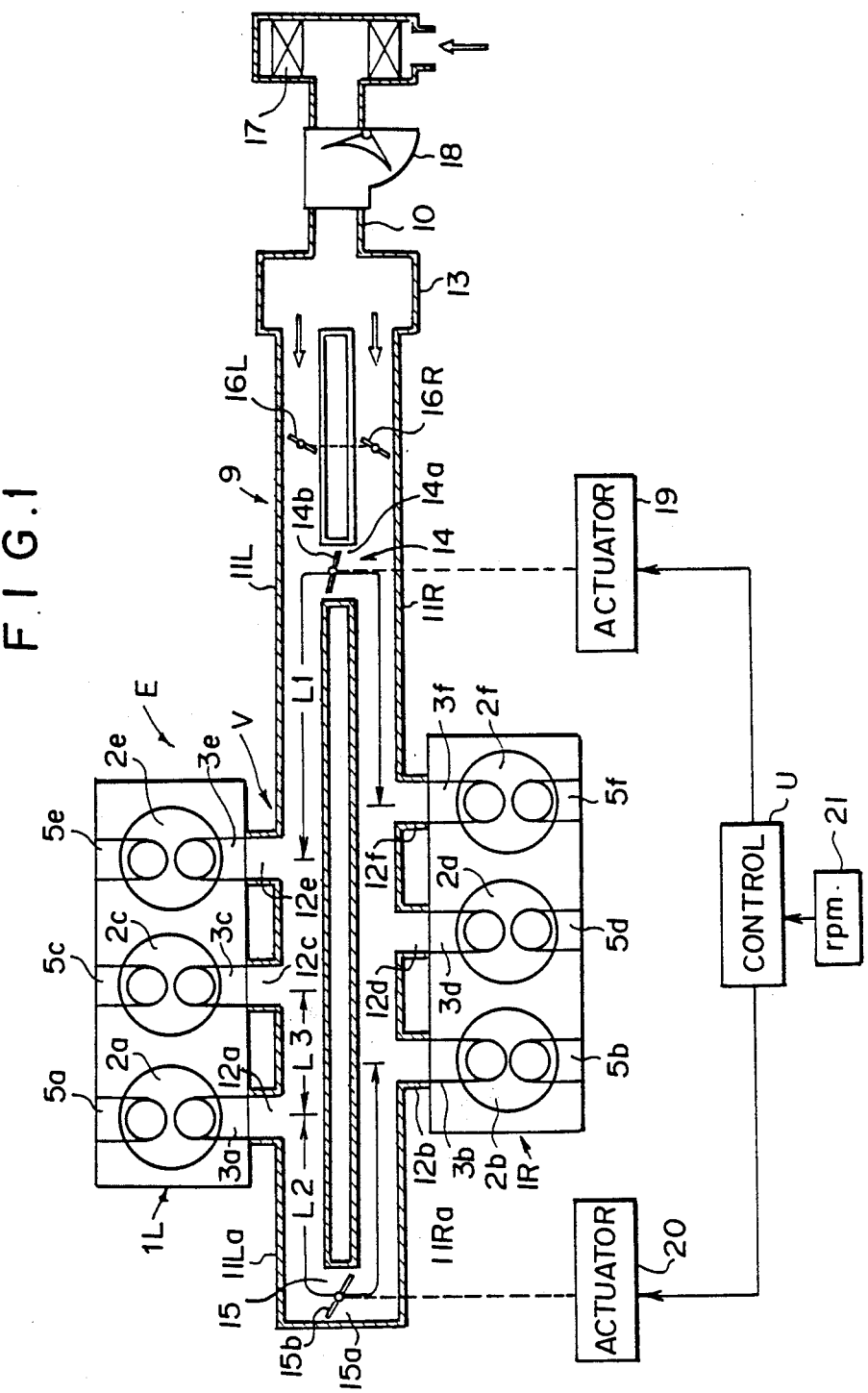
FIG. 1 is a schematic view showing a V-6 engine provided with a intake system in accordance with an embodiment of the present invention.
Figure 2:
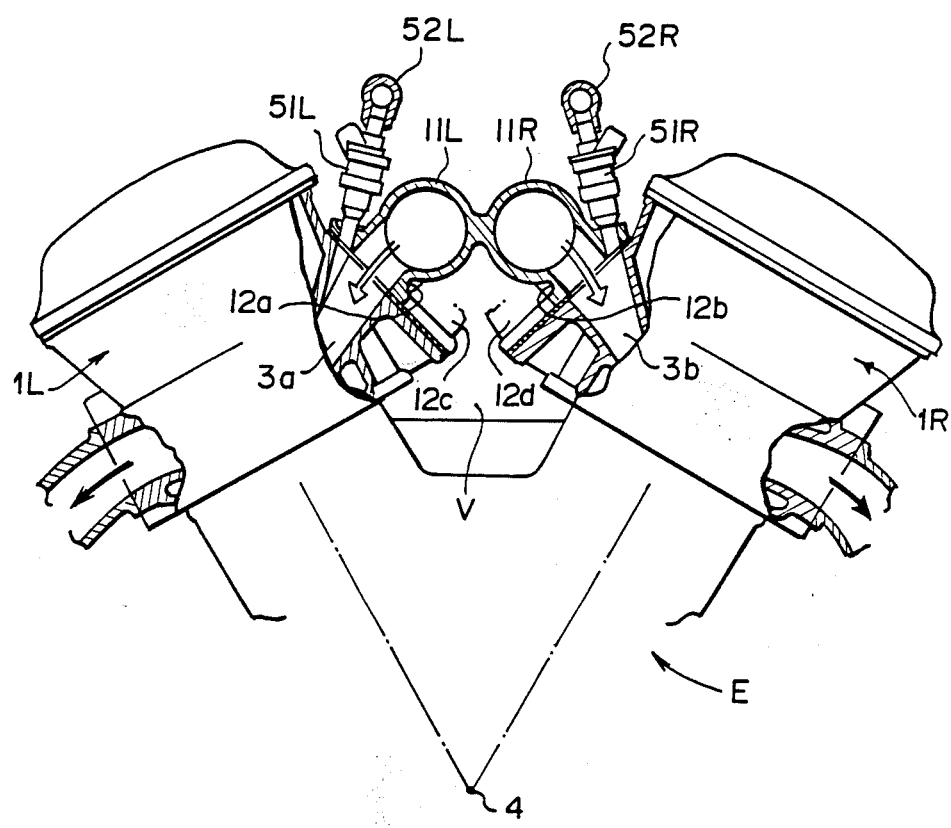
FIG. 2 is a cross-sectional view of the engine shown in FIG. 1.
Figure 3:
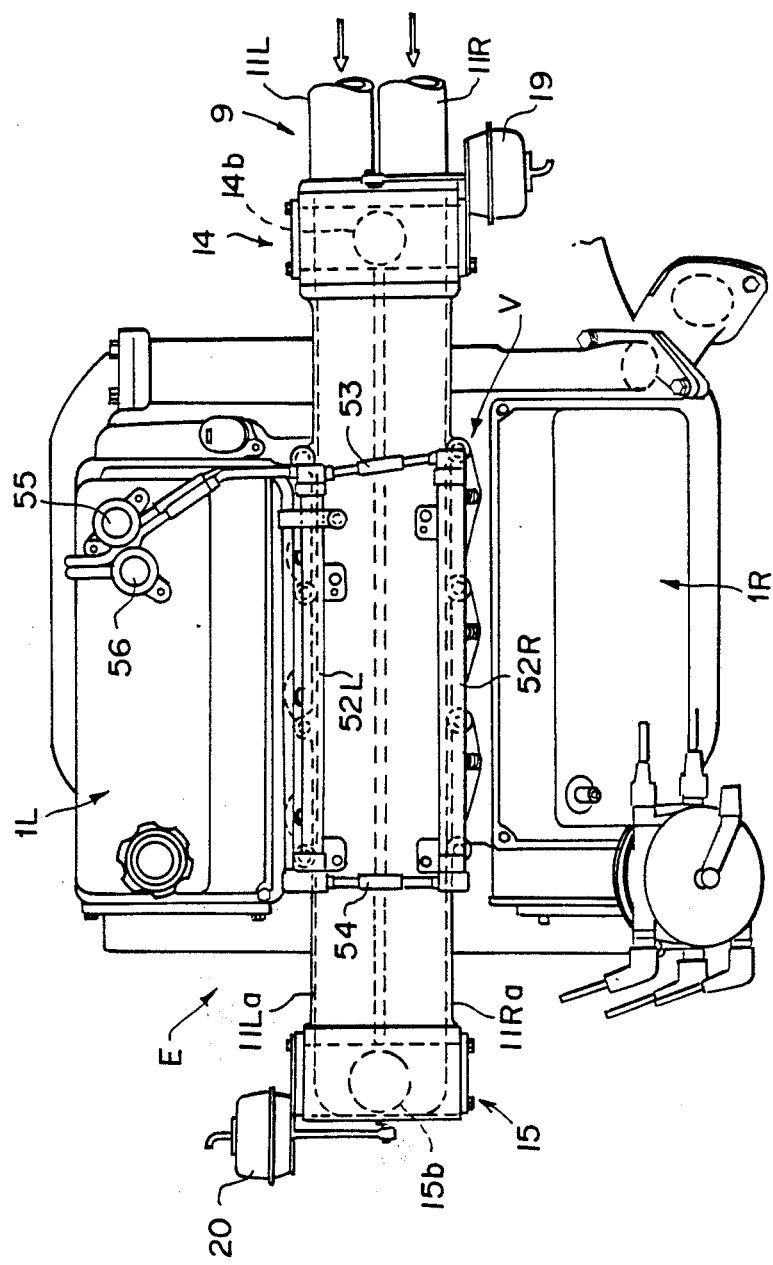
FIG. 3 is a plan view of the engine.

In FIGS. 1 to 3, an engine body E of a V-6 engine having an intake system in accordance with an embodiment of the present invention comprises left and right cylinder banks 1L and 1R set at an angle to each other. No. 1, No. 3 and No. 5 cylinders 2a, 2c and 2e are formed in the left cylinder bank 1L, and No. 2, No. 4 and No. 6 cylinders 2b, 2d and 2f are formed in the right cylinder bank 1R. The firing order is 5-6-3-4-1-2. That is, the cylinders 2a to 2f are divided into two groups and the cylinders in each group are disposed in one and the same cylinder bank so that the cylinders in each cylinder bank do not fire one after another. The cylinders 2a to 2f are respectively provided with intake ports 3a to 3f which open toward a V-shaped space V between the cylinder banks 1L and 1R. Further, the cylinders 2a to 2f are respectively provided with exhaust ports 5a to 5f which open in the sides of the corresponding cylinder banks remote from the V-shaped space V.

The cylinders 2a, 2c and 2e in the left cylinder bank 1L are arranged in a row parallel to the crankshaft 4 as are the cylinders 2b, 2d and 2f in the right cylinder bank 1R. The row of the cylinders 2a, 2c and 2e in the left cylinder bank 1L is offset forward (leftward in FIG. 1) relative to the row of the cylinders 2b, 2d and 2f in the right cylinder bank 1R.

Intake air is introduced into the cylinders 2a to 2f through an intake passage 9 comprising a common intake pipe 10, and left and right branch intake pipes 11L and 11R branching off from the downstream end of the common intake pipe 10. The branch intake pipes 11L and 11R project into the space V between the cylinder banks from one end of the cylinder banks and extend in parallel to the crankshaft 4 at the downstream end portions within the space V. The intake ports 3a, 3c and 3e for the cylinders 2a, 2c and 2e in the left cylinder bank 1L are separately communicated with the left branch intake pipe 11L by wa of discrete intake pipes 12a, 12c and 12e which are relatively small in length. Similarly the intake ports 3b, 3d and 3f for the cylinders 2b, 2d and 2f in the right cylinder bank 1R are separately communicated with the right branch intake pipe 11R by way of discrete intake pipes 12b, 12d and 12f which are relatively small in length. In this particular embodiment, the part of the branch intake passages 11L and 11R within the space V and near thereto and the discrete intake pipes 12a to 12f are integrally formed by casting, and fixed to the engine body E by bolting the discrete intake pipes 12a to 12f on the corresponding cylinder banks 1L and 1R.

The portion of the intake passage 9 at which the left and right branch intake pipes 11L and 11R branch off from the common intake pipe 10 forms a first pressure reflecting portion 13 having a relatively large volume. A second pressure reflecting portion 14 is formed at a portion downstream of the first pressure reflecting portion 13 and upstream of the V-shaped space V between the cylinder banks 1L and 1R. The second pressure reflecting portion 14 comprises a communicating passage portion 14a communicating the branch intake pipes 11L and 11R with each other and an on-off valve 14b for opening and closing the communicating passage portion 14a. The branch intake pipes 11L and 11R are respectively provided with extensions 11L-a and 11R-a projecting forward from the V-shaped space V. The extensions 11L-a and 11R-a are communicated with each other by way of a communicating passage portion 15a formed within a third pressure reflecting portion 15. The communicating passage portion 15a is opened and closed by an on-off valve 15b. The lengths of the extensions 11L-a and 11R-a are selected so that the second and third pressure reflecting portions 14 and 15 are symmetrical with respect to the center of the engine E.

Throttle valves 16L and 16R, which are interlocked with each other to be opened and closed by angles equal to each other, are respectively provided in the branch intake pipes 11L and 11R. In FIG. 1, reference numerals 17 and 18 respectively denote an air cleaner and an airflow meter.

A fuel injection valve 51L is provided in each of the discrete intake pipes 12a, 12c and 12e at the downstream end thereof, and a fuel injection valve 51R is provided in each of the discrete intake pipes 12b, 12d and 12f at the downstream end thereof. The upper ends of the fuel injection valves 51L and 51R are positioned higher than the branch intake pipes 11L and 11R and are respectively connected to delivery pipes 52L and 52R. The delivery pipes 52L and 52R extend substantially in parallel to the crankshaft 4 and are connected to a fuel supply passage 53 in parallel at one ends. The other ends of the delivery pipes 52L and 52R are connected, in parallel, to a fuel return passage 54. A damper 55 is connected to the fuel supply passage 53. Fuel in a fuel reservoir (not shown) is pumped into the delivery pipes 52L and 52R through the fuel supply passage 53 and distributed to the fuel injection valves 51L and 51R. A pressure regulator 56 is connected to the fuel return passage 54 and excessive fuel is returned to the fuel reservoir through the fuel return passage 54.

An engine speed signal is input into a control unit U from an engine speed sensor 21 and the control unit U outputs a control signal according to the engine speed to an actuator 19 for driving the on-off valve 14b in the second pressure reflecting portion 14 or an actuator 20 for driving the on-off valve 15b in the third pressure reflecting portion 15. The control unit U selectively opens and closes the on-off valves 14b and 15b according to the engine speed in the manner shown in FIG. 4(b). That is, when the engine speed is lower than a first value NA, the on-off valves 14b and 15b are both closed, and when the engine speed is higher than a second value NB which is larger than the first value NA, the on-off valves 14b and 15b are both opened. When the engine speed is not lower than the first value NA and not higher than the second value NB, the on-off valve 14b in the second pressure reflecting portion 14 is opened while the on-off valve 15b in the third pressure reflecting portion 15 is closed.

Figure 4:
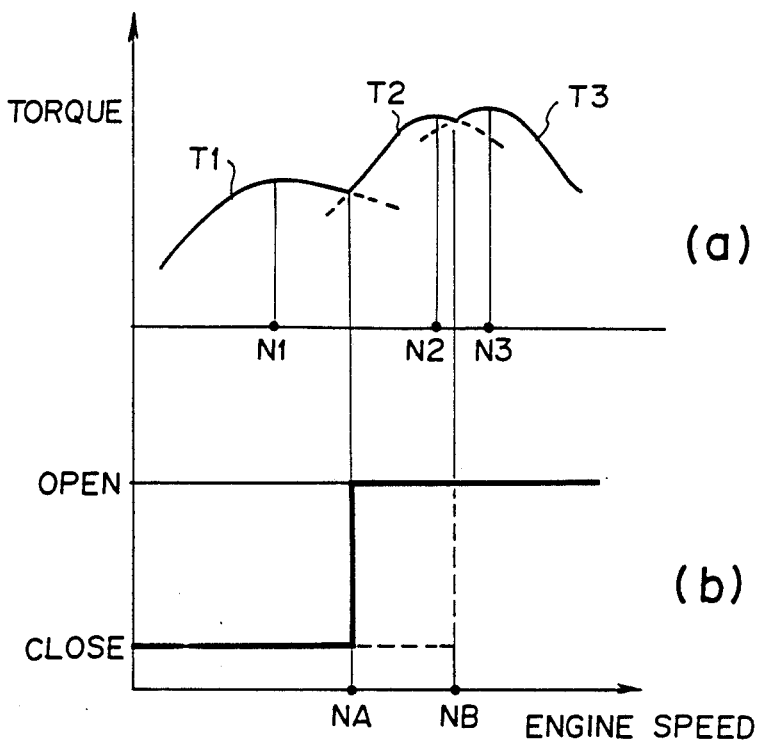
FIG. 4 is a view showing the relation of opening and closure of the on-off valves employed in the embodiment with the engine torque and the engine speed.

In the low engine speed range lower than the first value NA where both the on-off valves 14b and 15b are closed, the left and right branch intake pipes 11L and 11R are communicated with each other by way of the first pressure reflecting portion 13, whereby an extremely long resonance air column is formed which highly contributes to supercharging effect in the low engine speed range. Curve T1 in FIG. 4(a) is the torque curve in this case, and the resonance reaches a peak at an engine speed indicated at N1 in FIG. 4(a).

In the intermediate engine speed range between the first and second values NA and NB where the on-off valve 15b in the third pressure reflecting portion 14 is closed and the on-off valve 14b in the second pressure reflecting portion 14 is opened, the left and right branch intake pipes 11L and 11R are effectively communicated with each other by way of the second pressure reflecting portion 14, whereby a relatively long resonance air column is formed. Curve T2 in FIG. 4(a) is the torque curve in this case, and the resonance reaches a peak at an engine speed indicated at N2 in FIG. 4(a).

Figure 5:
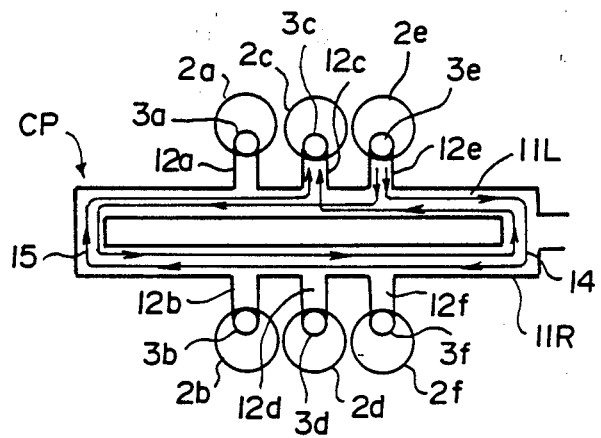
FIG. 5 is a schematic view for illustrating the principle of the present invention.

In the high engine speed range higher than the second value NB where the on-off valves 14b and 15b are both opened and the left and right branch intake pipes 11L and 11R are effectively communicated by way of both the second and third pressure reflecting portions 14 and 15, the resonance reaches a peak at an engine speed indicated at N3 which is higher than the engine speed N2 at which the resonance reaches a peak in the intermediate engine speed range. Curve T3 in FIG. 4(a) is the torque curve in this case. FIG. 5 is a schematic view showing an intake system equivalent to the intake system of this embodiment in the state where both the on-off valves 14b and 15b are opened and the left and right branch intake pipes 11L and 11R are effectively communicated by way of the second and third pressure reflecting portions 14 and 15, thereby forming a circular passage CP (FIG. 5). Near the intake ports for the cylinders which do not continuously fire one after another, for example, near the intake ports 3a, 3c and 3e for the cylinders 2a, 2c and 2e in the left cylinder bank 1L, there are generated basic pressure vibrations (represented by line A in FIG. 6) in which negative pressures are produced in the course of the intake strokes of the respective cylinders 2a, 2c and 2e and positive pressures are produced at the end of the intake strokes. For example, the pressure wave generated near the intake port 3e for No. 5 cylinder 2e is propagated along the circular passage CP in opposite directions and to act on the intake ports for the other cylinders in the cylinder bank, i.e., the intake ports 3a and 3c for No. 1 and No. 3 cylinders 2a and 2c in the left cylinder bank 1L as shown by the arrows in FIG. 5. In this case, the pressure wave is propagated along the circular passage CP without being reflected since the circular passage CP has no enlarged volume chamber.

When the time required for the pressure wave to circuit the circular passage CP is equalized to the period $\tau$ of the basic pressure vibrations described above, that is, when the relation between the overall length L of the circular passage CP (an equivalent length calculated taking into account the influence of the volume of the discrete intake pipes and the like) and the period $\tau$ becomes $$\tau = L/a \ldots \quad (1)$$

Figure 6:
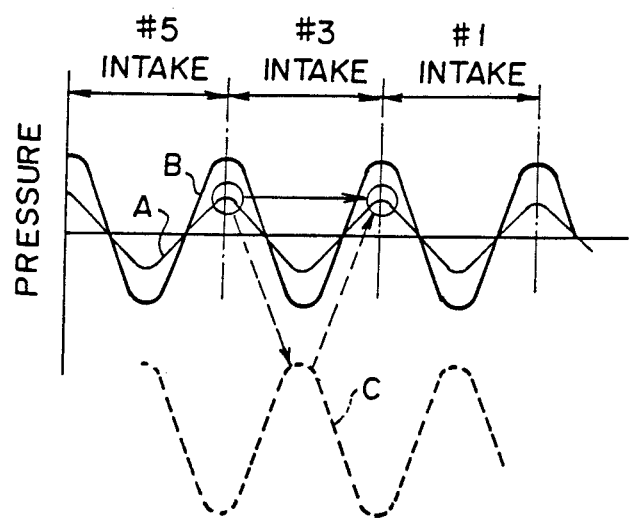
FIG. 6 is a view for illustrating a pressure vibration near the intake ports.

(wherein a represents the speed of sound)

a pressure wave generated in No. 5 cylinder 2e and propagated along the circular passage CP is superposed on a pressure wave generated in No. 3 cylinder 2c, and the pressure wave propagated from No. 3 cylinder 2c is superposed on a pressure wave generated in No. 1 cylinder 2a in a similar manner, and the pressure wave propagated from No. 1 cylinder 2a is superposed on the next pressure wave generated in No. 5 cylinder 2e in a similar manner as shown by the solid line arrow in FIG. 6. Thus, the pressure waves generated in the cylinders 2a, 2c and 2e in the left cylinder bank 1L resonate with each other, whereby the pressure vibration is enhanced as shown by line B in FIG. 6. Similarly, the pressure waves generated in the cylinders 2b, 2d and 2f in the right cylinder bank 1R resonate with each other, whereby the pressure vibration is enhanced as shown by line C in FIG. 6. By virtue of the resonance effect, the volumetric efficiencies in the respective cylinders can be highly improved in the high speed range.

It is preferred that the distance L1 between the discrete intake pipe 12e for No. 5 cylinder 2e (the upstream-most cylinder in the left cylinder bank 1L) and the discrete intake pipe 12f for No. 6 cylinder 2f (the upstream-most cylinder in the right cylinder bank 1R) as measured along the upstream side portion of the circular passage CP, and the distance L2 between the discrete intake passage 12a for No. 1 cylinder 2a (the downstream-most cylinder in the left cylinder bank 1L) and the discrete intake pipe 12b for No. 2 cylinder 2b (the downstream-most cylinder in the right cylinder bank 1R) as measured along the upstream side portion of the circular passage CP be sufficiently larger than the distance L3 between two adjacent discrete intake pipes in each cylinder bank, and more preferably the distances L1 and L2 are substantially equal to each other. That is if the distances L1 and L2 are as short as the distance L3, the intake ports in which the intake stroke occurs one after another are mutually communicated with a short distance intervening therebetween and the condition becomes equivalent to the condition that the cylinders are not divided into two groups, whereby the pressure wave generated in each cylinder will interfere with the pressure waves generated in the cylinders the intake strokes of which occur immediately before and after the intake stroke of the cylinder to weaken the mutual pressure waves. When the distances L1 and L2 are sufficiently large, independence of the mutual cylinder groups can be maintained and the interference of the pressure waves ca be prevented. Further when the distances L1 and L2 are substantially equal to each other, the time required for the pressure waves propagated from the intake ports in one cylinder bank, i.e., for the cylinders in one cylinder group to reach the intake ports in the other cylinder bank is equal to about a half of the time required for the pressure waves to circuit the circular passage CP, and accordingly, when the pressure waves from the cylinders in each cylinder group are in the state of resonance, the pressure waves propagated from one cylinder bank to the other cylinder bank through the upstream portion of the circular passage CP and the pressure waves propagated from said one cylinder bank to said one cylinder bank through downstream portion of the circular passage CP act on each other to mutually enhance the pressure vibrations as shown by the dashed line arrow in FIG. 6, thereby further enhancing the resonance supercharging effect.

Though the basic state of resonance in which one pressure wave of the pressure vibration generated in each cylinder group is superposed on the next pressure wave is shown in FIG. 6, a state of resonance can be obtained also when the pressure waves are propagated to be superposed on every second or third pressure wave, and accordingly, a state of resonance can be obtained at engine speeds an integral number of times as high as the engine speed at which said basic state of resonance is obtained. However, in the case that the distances L1 and L2 are substantially equal to each other, the pressure waves from the respective cylinder groups cancel each other at engine speeds an even number of times as high as the engine speed at which the basic state of resonance is obtained, and a state of resonance can be obtained only at engine speeds an odd number of times as high as the same.

As regards improving the volumetric efficiency at the high engine speed range, the intake system of this embodiment in which the circular passage CP is formed at the high engine speed range is advantageous over an intake system having a pressure reflecting portion upstream of the cylinders without a circular passage.

That is, if the branch intake pipes 11L and 11R are connected with each other only at a portion on the upstream side of the cylinders without being communicated on the downstream side of the cylinders and the junction thereof is arranged to function as a pressure reflecting portion, the volumetric efficiency is improved when a positive pressure wave obtained when a negative pressure wave generated in each cylinder is reflected by the pressure reflecting portion and comes to act on the cylinder to enhance the pressure at the and of the intake stroke, and the relation between the distance from the intake port to the pressure reflecting portion (equivalent length) L' and the period $\tau$ of the pressure vibration at this time is as follows.

$$\tau/2 = 2L'/a \ldots \quad (2)$$

Figure 7:
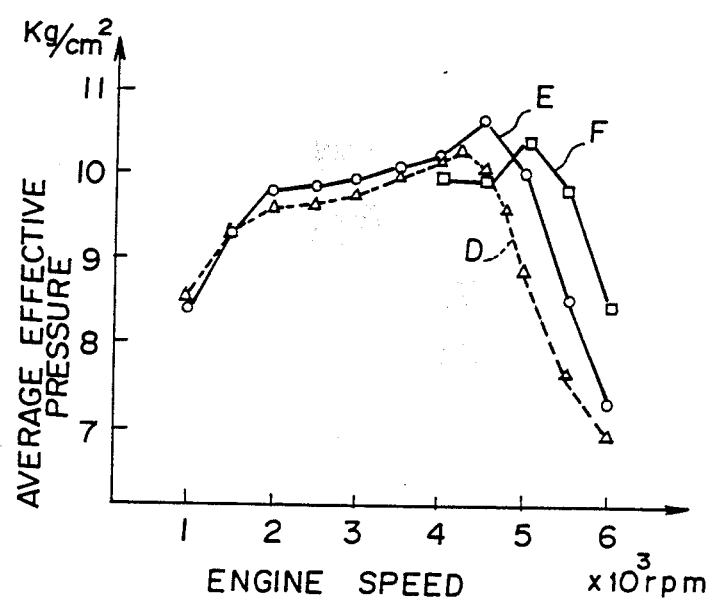
FIG. 7 is a graph for illustrating the effect of the present invention.

The period $\tau$ of the pressure vibration described above becomes shorter with increase in the engine speed. Accordingly, in order to enhance the supercharging effect in the high engine speed range, the distance L' between the intake port and the pressure reflecting portion must be short. However, the distance between the intake port and the pressure reflecting portion differs from cylinder to cylinder by the distance between adjacent intake ports, and as the distance between the cylinder and the pressure reflecting portion becomes small, the difference becomes relatively large, and inbalance of the pressure waves acting on the cylinders is increased, thereby making it difficult to improve the overall volumetric efficiency. Actually, our experiments revealed that when the distance between the intake port for the middle cylinder and the pressure reflecting portion is set to about 240 mm, the average effective pressure which represents the overall volumetric efficiency reaches a peak at about 4000 rpm as shown by line D in FIG. 7, but even if the distance concerned is further shortened, the average effective pressure cannot reach a peak at an engine speed higher than 4000 rpm.

On the other hand, in the case of the intake system of this embodiment, a resonance effect can be obtained when the formula (1) is satisfied. As can be understood from a comparison of the formulae (1) and (2), the overall length L of the circular passage CP which satisfies the formula (1) is four times as long as the length L' which satisfies the formula (2) for a given period $\tau$ of the pressure vibration. Accordingly, in the case of the intake system of this embodiment, the relative difference in the length of the pressure propagating path between the cylinders can be kept small even if the intake system is designed to obtain a sufficient resonance effect in the high engine speed range. For example, when the overall length L of the circular passage CP is 880 mm, the average effective pressure changes with the engine speed as shown by line E in FIG. 7 and reaches a peak at about 4500 rpm, and when the overall length L of the circular passage CP is 730 mm, the average effective pressure changes with the engine speed as shown by line F in FIG. 7 and reaches a peak at about 5000 rpm. It is possible to further increase the engine speed at which the average effective pressure reaches a peak.

As can be understood from the description above, in accordance with this embodiment, a satisfactory resonance effect can be obtained over a wide engine speed range covering the low engine speed range to the high engine speed range. When, unlike in this embodiment, a surge tank is provided in the intake system, the pressure vibration which contributes to the supercharging effect is weakened by the attenuating effect of the surge tank.

Further it is preferred that the length l and the diameter d of each discrete intake pipe be selected to satisfy the following formula.

$$\frac{\theta}{6} \times \frac{a}{2\pi} \sqrt{\frac{\frac{\pi}{4} d^2}{lV_m}} \geq 2N_{max}$$

wherein $\theta$ represents the crank-angle degree that the intake valve is open, $N_{max}$ represents the highest acceptable engine speed, a represents the speed of sound and $V_m$ represents the mean volume of the combustion chamber while the intake valve is open. That is, when the above formula is satisfied, inertia effect supercharging cannot occur in the discrete intake pipe. When inertia effect supercharging occurs in the discrete intake pipe, resonance effect supercharging is interfered with. More particularly, as is well known, the inertia effect is a phenomenon wherein a pressure propagates through a distance $2l+\alpha$ ($\alpha$ representing the distance between the piston and the intake valve at the time when the piston speed is at its maximum) during the time interval T from the time at which the piston speed is at its maximum to the end of the intake stroke while a negative pressure wave is converted into a positive pressure wave. The resonant wave which is generated at the end of the intake stroke takes a time T' substantially equal to the time interval T to propagate through a distance 2l. Accordingly, when inertia effect occurs, the phases of the pressure waves differ from each other by about T and thus interfere with each other. Accordingly, it is preferred than the sizes of the discrete intake pipes be selected to satisfy the above formula in order to prevent occurrence of the inertia effect.

Figure 8:
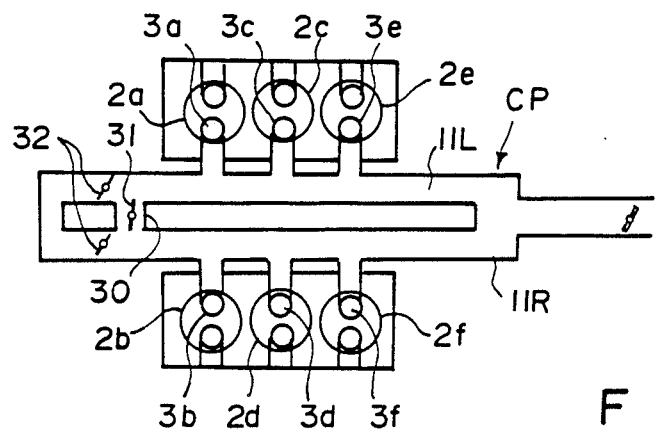
FIGS. 8 to 13 are schematic views respectively showing engines provided with intake systems in accordance with other embodiments of the present invention.

Though in the embodiment described above, the overall length L of the circular passage CP is not variable, the overall length L is changed according to the engine speed in the embodiment shown in FIG. 8. That is, in the embodiment shown in FIG. 8, the circular passage CP is provided with a communicating passage 30 which communicates the branch intake pipes 11L and 11R at a portion near the end of the downstream side portion of the passage CP. The communicating passage 30 is provided with a first on-off valve 31 and the branch intake passages 11L and 11R are respectively provided with second on-off valves 32 on the downstream side of the communicating passage 30. In this embodiment, in the highest engine speed range, the first on-off valve 31 is opened and the second on-off valves 32 are closed, and in the second highest engine speed range, the first on-off valve 31 is closed and the second on-off valves 32 are opened.

Figure 9:
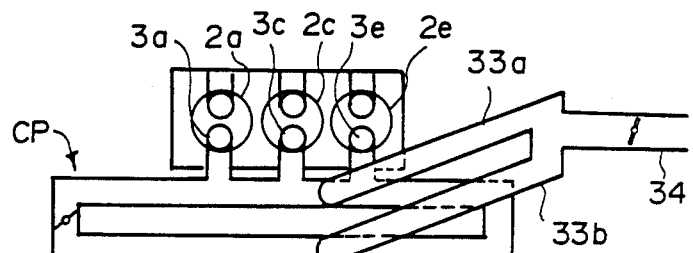

Though in the embodiments described above, intake air is introduced into the cylinders through the upstream side portion of the circular passage CP, as shown in FIG. 9, the circular passage CP may be separately formed from the intake passage for introducing intake air into the cylinders. In the embodiment shown in FIG. 9, the intake passage for introducing intake air into the cylinders is formed of a pair of branch intake pipes 33a and 33b which are connected at the respective upstream ends to the downstream end of a common intake passage 34 open to the atmosphere through an air cleaner (not shown) and connected at the respective downstream ends to the circular passage CP near the cylinders of the corresponding cylinder groups. With this arrangement, since intake air flows along only a portion of the circular passage CP near the cylinders and does not flow the major part of the circular passage CP, that is, since the portions of the circular passage CP on the upstream and downstream sides of the cylinders serve solely to propagate the pressure wave, the properties thereof such as the cross-sectional area can be selected solely taking into account the resonance effect free from requirements which must be satisfied when the circular passage CP serves also to introduce intake air into the cylinders.

Figure 10:
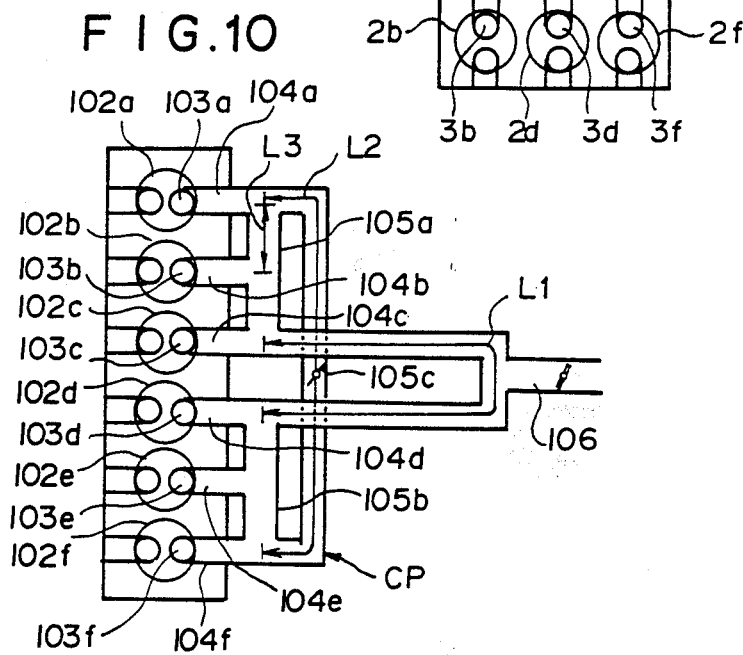

FIG. 10 shows another embodiment of the present invention in which the present invention is applied to a six-cylinder, in-line engine. In FIG. 10, a six-cylinder, in-line engine has six cylinders 102a to 102f arranged in a single line. Intake ports 104a, 104b and 104c for No. 1, No. 2 and No. 3 cylinders 102a, 102b and 102c which do not fire one after another (The firing order is 1-5-3-6-2-4, for example.) are connected to a first branch intake pipe 105a (L-shaped) by way of short discrete intake pipes 104a, 104b and 104c. Similarly, intake ports 104d, 104e and 104f for No. 4, No. 5 and No. 6 cylinders 102d, 102e and 102f which do not fire continuously one after another are connected to a second branch intake pipe 105b (L-shaped) by way of short discrete intake pipes 104d, 104e and 104f. The respective upstream ends of the first and second branch intake pipes 105a and 105b are connected to a common intake passage 106 which opens to the atmosphere by way of an air cleaner (not shown), and the downstream ends of the branch intake pipes 105a and 105b are extended and connected together, whereby a circular passage CP is defined. The distance L1 between the discrete intake pipe 104c for the upstream-most cylinder 102c in the cylinders arranged along the first branch intake pipe 105a and the discrete intake pipe 104d for the upstream-most cylinder 102d in the cylinders arranged along the second branch intake pipe 105b as measured along the upstream side portion of the first and second branch intake pipes 105a and 105b, and the distance L2 between the discrete intake pipe 104a for the downstream-most cylinder 102a in the cylinders arranged along the first branch intake pipe 105a and the discrete intake pipe 104f for the downstream-most cylinder 102f in the cylinders arranged along the second branch intake pipe 105b as measured along the extended portions of the first and second branch intake pipes 105a and 105b are sufficiently larger than the distance L3 between two adjacent discrete intake pipes. Further the distances L1 and L2 are made substantially equal to each other for the purpose described above in conjunction with the preceding embodiments. An on-off valve 105c is provided in the circular passage CP at the junction of the extended portions of the first and second branch intake pipes 105a and 105b.

Figure 11:
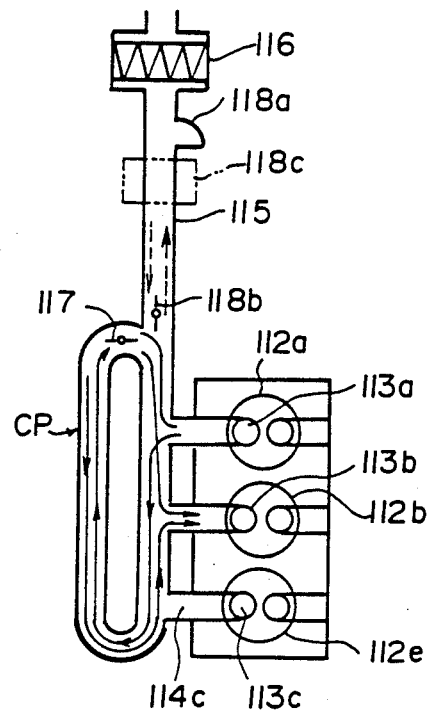

FIG. 11 shows still another embodiment of the present invention in which the present invention is applied to a three-cylinder, in-line engine. In FIG. 11, a three-cylinder, in-line engine has three cylinders 112a, 112b and 112c arranged in a single line. Intake ports 113a, 113b and 113c for the cylinders 112a to 112c are connected by way of short discrete intake pipes 114a to 114c to an intake passage 115 which opens to the atmosphere by way of an air cleaner 116. The downstream end portion of the intake passage 115 is extended to turn back and connect to a portion of the intake passage 115 upstream of the discrete intake pipe 114 for the cylinder 112a, i.e., the upstream-most cylinder, thereby forming a circular passage CP for resonance. The circular passage CP is provided with an on-off valve 117 which is controlled by a control unit (not shown) to close the circular passage CP in the low engine speed range and open the same in the low engine speed range. Reference numerals 118a add 118b in FIG. 11 respectively denote an airflow meter and a throttle valve. If required, a volume portion 118c may be provided in the intake passage 115 as shown by chain line.

Figure 12:
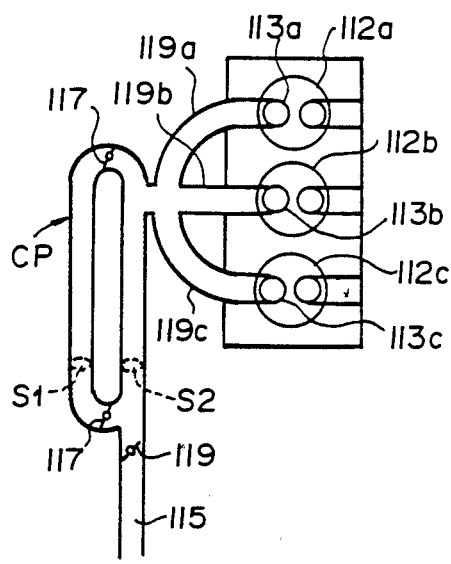

The embodiment shown in FIG. 12 is similar to the embodiment shown in FIG. 11, and accordingly, the parts analogous to the parts shown in FIG. 11 are given the same reference numerals and the difference between the embodiments will be mainly described here. In this embodiment, discrete intake pipes 119a to 119c for the cylinders 112a to 112c are converged together into a single pipe and then the single pipe is connected to the intake passage 115. The intake passage 115 is provided with the circular passage CP. The circular passage CP is provided with a pair of on-off valves 117 respectively at the upstream end portion and the downstream end portion. The cross-sectional area S1 of the part of the circular passage CP which does not serve to introduce intake air into the cylinders 112a to 112c is smaller than the cross-sectional area S2 through which intake air flows into the cylinders 112a to 112c. This serves to enhance the pressure wave propagated through the circular passage CP.

Figure 13:
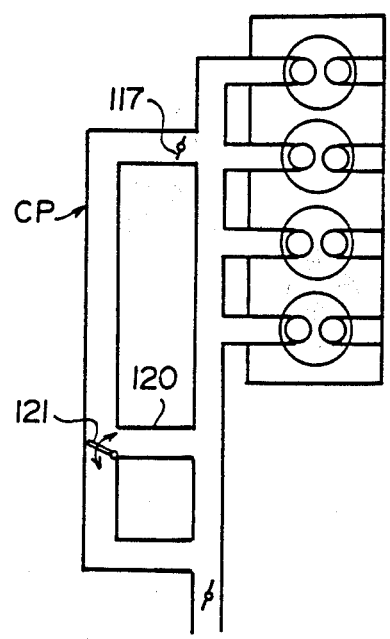

FIG. 13 shows another embodiment of the present invention in which the present invention is applied to a four-cylinder, in-line engine. The important feature of this embodiment is that the circular passage CP is provided with a shortcut passage 120 and a switching valve 121. The switching valve 121 is operated to open the shortcut passage 120 and to close the circular passage CP at a portion immediately upstream portion of the shortcut passage 120, thereby forming a relatively short circular passage when the engine speed is in the highest range, and is operated to close the shortcut passage 120 to form a relatively long circular passage when the engine speed is in the second highest range. The circular passage CP is also provided with an on-off valve 117 which opens the circular passage CP when the engine speed becomes higher than a predetermined speed.

We claim:

1. An intake system for a V-type multiple-cylinder engine, said intake system comprising:

first and second cylinder banks set at an angle to each other, said cylinder banks comprising a plurality of cylinders, wherein said cylinders in each bank do not fire one after another, said plurality of cylinders comprising a common intake passage open to the atmosphere at its upstream end, a plurality of discrete intake passages which communicate said respective cylinders with said common intake passage by way of intake ports, a circular passage which is communicated with said cylinders and is adapted to propagate pressure waves generated by the intake strokes without reflecting the pressure waves, and valve means for opening said circular passage to permit propagation of the pressure waves in a predetermined high engine speed range, the length of said circular passage being selected so that the pressure waves resonate in the predetermined high engine speed range;

wherein said discrete intake passages for said cylinders in said first cylinder bank are connected to said common intake passage by way of a first branch intake passage, said discrete intake passages for said cylinders in said second cylinder bank are connected to said common intake passage by way of a second branch intake passage separated from said first branch intake passage, and said first and second branch intake passages are connected together at the respective downstream ends and at upstream side portions to form said circular passage, said circular passage running through said first branch intake passage, the junction of the downstream ends of said first and second branch intake passages, said second branch intake passage, and the upstream side junction of said first and second branch intake passages; and wherein said junction of the downstream ends of said first and second branch intake passages forms a first pressure reflecting portion, and said upstream side junction of said first and second branch intake passages forms a second pressure reflecting portion, said first and second pressure reflecting portions being respectively provided with first and second on-off valves which are both opened to open said circular passage in the high engine speed range.

2. An intake system as defined in claim 1, wherein said first and second branch intake passages converge at the upstream ends thereof and connect to the common intake passage, the junction of said first and second branch intake passages forming a third pressure reflecting portion.

3. An intake system as defined in claim 1 wherein said first and second on-off valves are both closed in a low engine speed range, and said first on-off valve is closed and said second on-off valve is open in the intermediate engine speed range between the low engine speed range and the high engine speed range, the length of the first and second branch intake passages is selected so that the pressure valves resonate in the low engine speed range, and the distance between the cylinders and the second pressure reflecting portions is selected so that the pressure waves resonate in the intermediate engine speed range when said second on-off valve is open and said first on-off valve is closed.

4. An intake system as defined in claim 1 wherein said circular passage is provided with a shortcut passage communicating the first and second branch intake passages with each other at a portion upstream of the first pressure reflecting portion, and the shortcut passage is provided with an on-off valve which is open when the engine speed exceeds a predetermined value in the high engine speed range.

5. An intake system as defined in claim 1 in which said intake valves in the respective cylinders open toward the space between said first and second cylinder banks and said first and second branch intake passages extend in the longitudinal direction of said cylinder banks.

6. An intake system as defined in claim 1 wherein the length and the diameter of each of said discrete intake passages are selected so that the inertia effect does not occur in the high engine speed range.

7. An intake system as defined in claim 1 wherein said first and second on-off valves open at different engine speeds.

8. An intake system for an in-line multiple-cylinder engine, said intake system comprising:

first and second sets of cylinders comprising a plurality of cylinders, wherein said cylinders do not fire one after another, said plurality of cylinders comprising a common intake passage open to the atmosphere at its upstream end, a plurality of discrete intake passages which communicate respective said cylinders with said common intake passage by way of intake ports, a circular passage which i communicated with said cylinders and is adapted to propagate pressure waves generated by the intake strokes without reflecting the pressure waves, and valve means for opening said circular passage to permit propagation of the pressure waves in a predetermined high engine speed range, the length of said circular passage being selected so that the pressure waves resonate in the predetermined high engine speed range;

wherein said discrete intake passages for said first set of cylinders are connected to said common intake passage by way of a first branch intake passage, said discrete intake passages for said second set of cylinders are connected to said common intake passage by way of a second branch intake passage separated from said first branch intake passage, and said first and second branch intake passages are connected together at the respective downstream ends and at upstream side portions to form said circular passage, said circular passage running through said first branch intake passage, the junction of the downstream ends of said first and second branch intake passages, said second branch intake passage, and the upstream side junction of said first and second branch intake passages;

wherein said junction of the downstream ends of said first and second branch intake passages forms a first pressure reflecting portion, and said upstream side junction of said first and second branch intake passages forms a second pressure reflecting portion, said first pressure reflecting portion being provided with an on-off valve which is opened to open said circular passage in the high engine speed range; and wherein the length and the diameter of the discrete intake passages are selected so that the inertia effect does not occur in the high engine speed range.

9. An intake system as defined in claim 8 wherein said multiple-cylinder engine is an in-line engine having a plurality of cylinders arranged in a single line, and said cylinders are divided into first and second cylinder groups so that said cylinders in each cylinder group do not fire one after another, said discrete intake passages for said cylinders of said first cylinder group are connected to said common intake passage by way of a first branch intake passage add said discrete intake passages for said cylinders of said second cylinder group are connected to said common intake passage by way of a second branch intake passage, said first and second branch intake passages are connected together at the respective downstream ends to form said circular passage, said circular passage running through said first branch intake passage, the junction of the downstream ends of the first and second branch intake passage, said second branch intake passage, and the junction of said first and second branch intake passages to said common intake passage, and said valve means is provided at said junction of the downstream ends of said first and second branch intake passages.

10. An intake system as defined in claim 8 wherein said multiple-cylinder engine is an in-line engine having a plurality of cylinders arranged in a single line, and said discrete intake passages are connected to said common intake passage in parallel, said circular passage being formed by providing the common intake passage with an extension passage which connects the downstream end of said common intake passage with a portion of said common intake passage upstream of said junction of said discrete intake passage for the upstream-most cylinder to said common intake passage.

11. An intake system as defined in claim 8 wherein said multiple-cylinder engine is in in-line engine having a plurality of cylinders arranged in a single line, and said discrete intake passages are merged together and connected to said common intake passage by way of a single passage, said circular passage being formed by providing said common intake passage with an extension passage which connects the downstream end of said common intake passage with a portion of said common intake passage upstream of said junction of the single passage of said common intake passage.

12. An intake system as defined in claim 8 wherein the cross-sectional area of said extension passage is smaller than the cross-sectional area of said common intake passage.

13. An intake system for a V-type multiple-cylinder engine, said intake system comprising:

first and second cylinder banks set at an angle to each other, said cylinder banks comprising a plurality of cylinders, wherein said cylinders in each bank do not fire one after another, said plurality of cylinders comprising a common intake passage open to the atmosphere at its upstream end, a plurality of discrete intake passages which communicate said respective cylinders with said common intake passage by way of intake ports, a circular passage which is communicated with said cylinders and is adapted to propagate pressure waves generated by the intake strokes without reflecting the pressure waves, and first valve means for opening said circular passage to permit propagation of the pressure waves in a predetermined high engine speed range, the length of said circular passage being selected so that the pressure waves resonate in the predetermined high engine speed range;

wherein said discrete intake passages for said cylinders in said fist cylinder bank are connected to said common intake passage by way of a first branch intake passage, said discrete intake passages for said cylinders in said second cylinder bank are connected to said common intake passage by way of a second branch intake passage separated from said first branch intake passage, and said first and second branch intake passages are connected together at the respective downstream ends and at upstream side portions via first upstream and first downstream junction passages to form said circular passage, said circular passage running through said first branch intake passage, said first downstream junction passage, said second branch intake passage, and said first upstream junction passage;

wherein said first downstream junction passage forms a first pressure reflecting portion, and said first upstream junction passage forms a second pressure reflecting portion, said first valve means is located in said first downstream junction passage and opens said circular passage when the engine operates in the high engine speed range; and wherein the length of each of said discrete intake passage is sufficiently short so that the inertia effect does not occur in the high engine speed range.

14. An intake system as defined in claim 13 wherein L1, the distance between said discrete intake passage for the upstream-most cylinder in said first cylinder bank and said discrete intake passage for the upstream-most cylinder in said second cylinder bank as measured along the upstream side portion of said circular passage is sufficiently larger than L3, the distance between two adjacent cylinders in either cylinder bank; and L2, the distance between said discrete intake passage for the downstream-most cylinder in said first cylinder bank add said discrete intake passage for the downstream-most cylinder in said second cylinder bank as measured along the downstream side portion of said circular passage is sufficiently larger than L3.

15. An intake system as defined in claim 13 wherein L1 is substantially equal to L2.

16. An intake system as defined in claim 13 wherein the length "1" and the diameter "d" of each discrete intake passage is selected to satisfy the following formula:

$$\frac{\theta}{6} \times \frac{a}{2\pi} \sqrt{\frac{\frac{\pi}{4} d^2}{lV_m}} \geqq 2 N_{max}$$

where 0 is the crank angle degree that the engine intake valve is open, Nmax is the maximum acceptable engine speed, a is the speed of sound, and Vm is the mean volume of the combustion chamber of the engine when the intake valve is open.

17. An intake system as defined in claim 13 further comprising a second downstream junction passage connecting the downstream ends of said first and second intake passages, and second valve means located in said second downstream junction passage for opening said circular passage to permit propagation of the pressure waves in the high engine speed range.

18. An intake system as defined in claim 13 wherein said circular passage is formed separately from said common intake passage, said common intake passage terminates at its downstream end in a pair of branch intake pipes separate from and connected at their downstream ends to said circular passage, and each branch intake pipe is connected to a respective branch intake passage.

19. An intake system for a V-type multiple-cylinder engine, said intake system comprising:

first and second cylinder banks set at an angle to each other, said cylinder banks comprising a plurality of cylinders, wherein said cylinders in each bank do not fire one after another, said plurality of cylinders comprising a common intake passage open to the atmosphere at its upstream end, a plurality of discrete intake passages which communicate said respective cylinders with said common intake passage by way of intake ports, a circular passage which is communicated with said cylinders and is adapted to propagate pressure waves generated by the intake strokes without reflecting the pressure waves, and valve means for opening the circular passage to permit propagation of the pressure waves in a predetermined high engine speed range, the length of said circular passage being selected so that the pressure waves resonate in the predetermined high engine speed range; and a fuel supply nozzle associated with each discrete intake passage;

wherein said discrete intake passages for said cylinders in said first cylinder bank are connected to said common intake passage by way of a first branch intake passage, said discrete intake passages for said cylinders in said second cylinder bank are connected to said common intake passage by way of a second branch intake passage separated form said first branch intake passage, the connection between respective discrete intake passages and said branch intake passages is disposed in a V-shaped space formed between said first and second cylinder banks and extends parallel to the axial direction of the engine crankshaft, and said first and second branch intake passages are connected together at the respective downstream ends and at upstream side portions via first upstream and fist downstream junction passages to form said circular passage, said circular passage running through said first branch intake passage, said first downstream junction passage, said second branch intake passage, and said first upstream junction passage;

wherein said first downstream junction passage forms a first pressure reflecting portion, and said first upstream junction passage forms a second pressure reflecting portion;

wherein the length of each of the discrete intake passages is sufficiently short so that the inertia effect does not occur in the high engine speed range; and wherein said branch intake passages and said junction passages each have a diameter and a volume sufficiently small to preclude their use as a surge tank.

20. An intake system as defined in claim 19 wherein said branch intake passages comprise respective extension which project forward from said V-shaped space and which communicate with each other through a communicating passage portion to form a third pressure reflecting portion.

21. An intake system as defined in claim 19 wherein said valve means is located in said first downstream junction passage and opens said circular passage when the engine operates in the high engine speed range.

22. An intake system as defined in claim 19 wherein L1, the distance between said discrete intake passage for the upstream-most cylinder in said first cylinder bank and said discrete intake passage for the upstream-most cylinder in said second cylinder bank as measured along the upstream side portion of said circular passage, is sufficiently larger than L3, the distance between two adjacent cylinders in either cylinder bank; and L2, the distance between said discrete intake passage for the downstream-most cylinder in said first cylinder bank and said discrete intake passage for the downstream-most cylinder in said second cylinder bank as measured along the downstream side portion of said circular passage is sufficiently larger than L3.

23. An intake system as defined in claim 19 wherein L1 is substantially equal to L2.

* * * * *